United States Patent Office 2,693,528
Patented Nov. 2, 1954

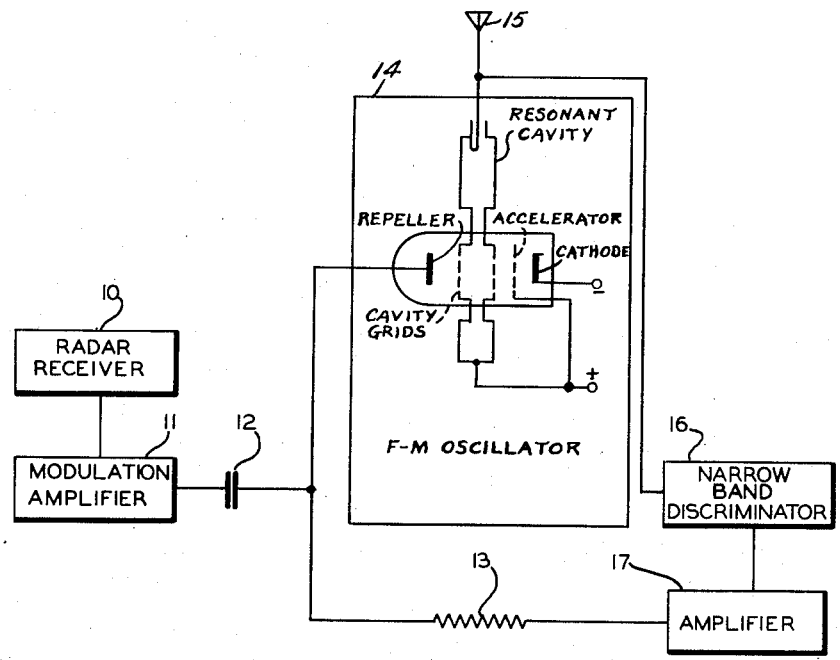

2,693,528

APPARATUS FOR FREQUENCY STABILIZATION

Lowell M. Hollingsworth, Cambridge, Mass., assignor, by mesne assignments, to the United States of America as represented by the Secretary of the Navy Application December 14, 1945, Serial No. 635,092

3 Claims. (Cl. 250—17)

This invention relates to a communication system, and more particularly, apparatus for stabilizing the frequency of a frequency-modulated (hereinafter called F-M) transmitter.

In F-M transmission, if the modulating voltage is sinusoidal, or of other symmetrical form, the side band frequencies are arranged on either side of the carrier. When it is necessary to stabilize the undeviated frequency, a broad-band discriminator can be employed. The discriminator operates so as to produce a positive voltage as the frequency is deviated in one direction and a negative voltage as the frequency is deviated in the other direction. Because the carrier frequency is the center or average frequency, the positive and negative contributions from the discriminator will cancel each other if on frequency. If off frequency, the net resulting discriminator output can be utilized to correct and hold the carrier frequency constant.

In the case of unsymmetrical modulation, such as video modulation, the modulating voltage is essentially one sided, and side band frequencies appear predominantly on one side of the carrier. In the case of such pulse modulation, the frequencies transmitted can be shown to very closely approach a continuous signal at the carrier frequency, plus a spectrum at this frequency corresponding to that of an amplitude modulated pulse, plus a spectrum at the deviated frequency also corresponding to that of an amplitude modulated pulse. It is now no longer true that the carrier is the center frequency and, consequently, the use of such a broad-band discriminator would cause the carrier frequency to change in value depending upon the fraction of time the signal is deviated. Thus, the carrier frequency would lock in at a frequency determined by the modulating voltage.

It is then, the object of the present invention, to provide apparatus for stabilizing the frequency of a frequency-modulated transmitter while an unsymmetrical modulation voltage is being applied.

This and other objects will be apparent upon consideration of the following specification, taken with the accompanying drawing, the single figure of which illustrates an embodiment of the present invention.

Briefly, the stabilization scheme utilizes the output of discriminator 16 as an error voltage, which, when applied to frequency-modulated oscillator tube 14, causes the frequency of the oscillator tube to be locked at the cross-over frequency of the discriminator.

This idea is here applied to a radar relay system. A convenient method of relaying radar echo information to a control station located some distance from the radar includes the use of an F-M transmitter. The video signals at the output of the radar receiver provide the modulating signal. The pertinent part of such an embodiment has been illustrated in the accompanying drawing.

The ouput of radar receiver 10 is amplified in modulation amplifier 11 and coupled to the voltage sensitive frequency controlling electrode of oscillator 14, in this case a reflex velocity modulated tube. The modulation signal is applied to the oscillator with A. C. coupling, capacitor 12 being so used. A portion of the output of oscillator 14 is applied to a narrow-band discriminator 16. The term narrow-band, as used herein, implies that the output versus frequency characteristic of the discriminator has a relatively narrow frequency response as compared to the predetermined amount of deviation of the oscillator frequency when modulated. Stating this in more general terms, the discriminator should be responsive only to the undeviated oscillator frequency and not the deviated frequency.

The physical type of discriminator used will be dependent upon the carrier frequency of the oscillator. At very high frequencies such a discriminator may be comprised of two "Magic Tees" (as disclosed and claimed in the copending application of Robert L. Kyhl, Serial No. 580,014, filed February 27, 1945, on "Transmission Systems," now abandoned), a resonant cavity, and two detectors. This discriminator functions as a bridge which compares the reflection from a short circuit with that from the resonator, the short and the resonator terminating opposite arms of one Tee. The output versus frequency characteristic is quite linear, with the crossover frequency corresponding to the resonant frequency of the cavity. If the undeviated (or carrier) oscillator frequency varies from the crossover frequency of the discriminator characteristic, a positive or a negative voltage will be produced at the output of the discriminator, the polarity being determined by the direction of the variation. This error voltage is applied by means of D. C. coupling, a resistor 13 in the present case, to the frequency-controlling element of the oscillator, and so locks in the carrier frequency at the discriminator crossover frequency. Since the discriminator is not responsive to the deviated frequency (the deviation may be six megacycles, as compared to a one megacycle discriminator response) only the carrier frequency will affect the stabilization circuits. It may be desirable to amplify the discriminator output, as in amplifier 17, before applying the same to the oscillator. The net result of this stabilization is that the carrier frequency appearing at antenna 15 is effectively locked in at a predetermined frequency.

Though the invention has been describd as embodied in a communication system, this method may be used to stabilize the frequency of an oscillator for any desired adaptation. Changes may be made in the circuits disclosed without departing from the invention, as sought to be defined in the following claims.

What is claimed is:

1. Automatic frequency control for a frequency modulated transmitter of pulse signals comprising a source of signal voltage pulses, an electron tube oscillator having a voltage sensitive frequency controlling electrode, means for applying said voltage pulses to said electrode to cause a predetermined deviation of frequency of said oscillator, a discriminator responsive to a narrow band of frequencies in the region of the unmodulated oscillator frequency and nonresponsive to the deviated frequency of said modulated oscillator, means for coupling a portion of the output of said oscillator to said discriminator thereby to produce an output potential from said discriminator related to said unmodulated oscillator frequency, and means for applying the output potential of said discriminator to said frequency controlling electrode to stabilize said unmodulated oscillator frequency.

2. In a frequency modulated communication system, a reflex velocity modulated oscillator having a voltage sensitive frequency controlling electrode, a frequency discriminator responsive over a band of frequencies and coupled to said oscillator to produce an output potential having amplitude and polarity related to magnitude and direction of variation of said oscillator frequency from the resonant frequency of said discriminator, means for applying said discriminator output potential to said frequency controlling electrode to stabilize the frequency of said oscillator, a source of signal voltage pulses, an amplifier for said pulses, and means coupling the output of said amplifier to said frequency controlling electrode at a potential level to produce a predetermined deviation of frequency of said oscillator greater than the frequency response of said discriminator.

3. In a frequency modulated communication system, a reflex velocity modulated oscillator having a voltage sensitive frequency controlling electrode, a frequency discriminator resonant at said oscillator frequency and coupled to said oscillator, said discriminator being responsive over a band of frequencies to produce an output potential having amplitude and polarity related to magnitude and direction of variation of said oscillator frequency from the resonant frequency of said discriminator, means for applying said discriminator output potential to said frequency controlling electrode to stabilize the frequency of said oscillator at the resonant frequency of said discriminator, a source of signal voltage pulses, an amplifier for said pulses, and means coupling the output of said amplifier to said frequency controlling electrode at a potential level to produce a predetermined deviation of frequency of said oscillator from said stabilized frequency greater than the frequency response of said discriminator.

References Cited in the file of this patent

UNITED STATES PATENTS

| Number | Name | Date |
|---|---|---|
| 1,530,169 | Grimes | Mar. 17, 1925 |
| 1,626,724 | Demarest et al. | May 3, 1927 |
| 2,262,932 | Guanella | Nov. 18, 1941 |
| 2,284,415 | Goldstine | May 26, 1942 |
| 2,287,044 | Kroger | June 23, 1942 |
| 2,287,065 | Roberts | June 23, 1942 |
| 2,312,079 | Crosby | Feb. 23, 1943 |
| 2,312,374 | Unger | Mar. 2, 1943 |
| 2,337,214 | Tunick | Dec. 21, 1943 |
| 2,405,765 | Smith | Aug. 13, 1946 |